Figure 1:
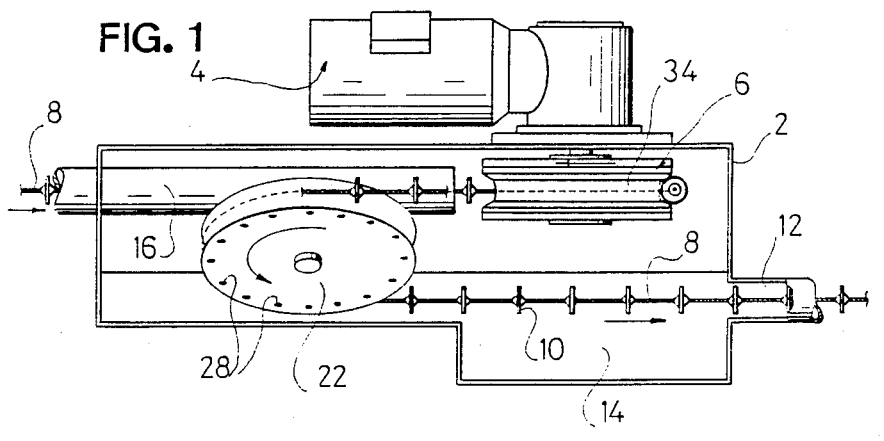

United States Patent [19]

Dahl et al.

[11] Patent Number: 4,871,060
[45] Date of Patent: Oct. 3, 1989

[54] SCRAPING CONVEYOR

[76] Inventors: Christian Dahl, Svanebjerggaard; Thöge Dall, Aftensang 22, both of Egtved, Denmark

[21] Appl. No.: 499,157
[22] PCT Filed: Sep. 30, 1982
[86] PCT No.: PCT/DK82/00088
§ 371 Date: May 31, 1983
§ 102(e) Date: May 31, 1983
[87] PCT Pub. No.: WO83/01245
PCT Pub. Date: Apr. 14, 1983

[30] Foreign Application Priority Data

Sep. 30, 1981 [DK] Denmark ............................. 4324/81

[51] Int. Cl.$^4$ ............................................. B65G 19/14
[52] U.S. Cl. ................................... 198/716; 198/729; 198/733
[58] Field of Search ............... 198/716, 733, 729, 835

[56] References Cited

U.S. PATENT DOCUMENTS

| 2,326,535 | 8/1943 | Hapman | 198/733 |
| 2,333,926 | 11/1943 | Hapman | 198/733 X |
| 2,357,651 | 9/1944 | Hapman | 198/716 X |
| 2,692,067 | 10/1954 | Hapman | 198/716 X |

FOREIGN PATENT DOCUMENTS 111962 11/1940 Australia ............................. 198/716
2501971 7/1975 Fed. Rep. of Germany.

Primary Examiner—Robert J. Spar
Assistant Examiner—Cheryl L. Gastineau
Attorney, Agent, or Firm—Antonelli, Terry & Wands

[57] ABSTRACT

A scraper conveyor comprising a conveyor chain or wire provided with a plurality of transverse scraper discs and passing along a closed path at least partly defined by a stationary conveyor channel or a tube extending from a material inlet station and past at least one receiver station, in which the material is dispensable through outlet openings in said channel or tube. The conveyor chain or wire is driven by a driving wheel engaging the transverse scraper discs, with the driving wheel being a circumferentially substantially smooth wheel having an outer cross sectional shape which conditions a frictional engagement between the wheel and the wheel periphery engaging portions of the outer edges of the scraper members. A tightener is provided for tightening the moved element of the conveyor about the driving wheel sufficiently to ensure a firm frictional engagement between these parts. The driving engagement between the driving wheel and the conveyor wire is entirely independent of the exact distance between the consecutive scraper discs because the driving engagement is established between the smooth circumferences of the driving wheel and the outer edge portions of the scraper discs.

3 Claims, 1 Drawing Sheet

SCRAPING CONVEYOR

The present invention relates to a scraper conveyor of the type comprising a conveyor chain or wire, which is provided with a plurality of transverse scraper members and passes along a closed path at least partly defined by stationary conveyor channel or tube means extending from a material inlet station and past one or more receiver stations, in which the material is dispensable through outlet openings in said channel or tube means, the conveyor chain or wire being driven by means of a driving wheel engaging with said transverse scraper members. Such conveyors are widely used e.g. as feedstuff conveyors for distributing feedstuff to a plurality of feeding places in different types of animal houses.

The transverse scraper members are normally made as circular discs which are centrall rigidly associated with respective chain links or with the wire with constant mutual spacing e.g. fine cm, and the driving wheel is a sprocket having radial teeth or projections drivingly cooperating with the rear sides of the scraper members as the conveyor chain or wire passes about a portion of the sprocket circumferences.

In the following reference will be made solely to circular scraper discs as provided on a wire, concentrically therewith, but it will be appreciated that the invention will even apply to conveyors in which the scraper members are mounted on a chain and/or in which the scraper members are not exactly circular or concentrically arranged on the chain or wire.

As in case of a sprocket driving a chain it is desirable that the driving sprocket cooperates with several scraper discs at the same time, i.e. the discs should be provided with a highly uniform mutual spacing on the wire. This is in fact achievable, normally by die casting the discs directly on the wire with the required intervals therealong, whereby the discs may at the same time be stabilized against tilting on the wire, viz. by being shaped with a central hub portion of increased axial length.

In practice, however, the driving of the conveyor wire causes considerable problems with respect to the uniform distribution of the driving force between the various scraper discs as being present on the sprocket at any time. Even small differences in the unavoidable wear on the rear sides of the discs as cooperating with the sprocket may change the effective pitch of the discs, and so may feedstuff deposits on the rear sides. A special problem resides in the joining of the opposed wire ends for the forming of a closed wire loop or endless conveyor wire, because it is hereby rather critical that the wire ends be joined so as to provide for the required exact standard spacing between the discs at both sides of the joint.

It is the purpose of the invention to provide a conveyor of the above-mentioned type in which the moved conveyor element is drivable without particular problems arising from a possible non-constancy of the effective pitch of the scraper members as engaged by the driving wheel of the driving station.

According to the invention the driving wheel is a circumferentially substantially smooth wheel having an outer cross sectional shape which conditions a frictional engagement between the wheel and the wheel periphery engaging portions of the outer edges of the scraper members, means being provided for tightening the moved element of the conveyor about the driving wheel sufficiently to ensure a firm frictional engagement between these parts.

Hereby the driving engagement between the driving wheel and the conveyor wire will be entirely independent of the exact distance between the consecutive scraper discs, because the driving engagement is established between the smooth circumference of the driving wheel and the outer edge portions of the consecutive scraper discs, without specific relevance to any exact location of the rear sides of the scraper discs.

Preferably the driving wheel is profiled with a recess operable to receive approximately one half of the discs and to frictionally engage the discs adjacent almost diametrically opposite edge portions thereof, whereby the traction force on the wire is transferred from the driving wheel practically without any tilting action on the discs.

Figure 2:
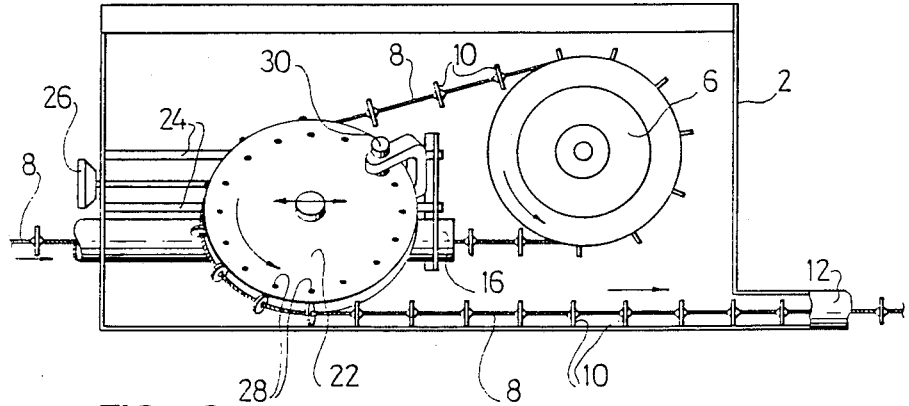
Figure 3:
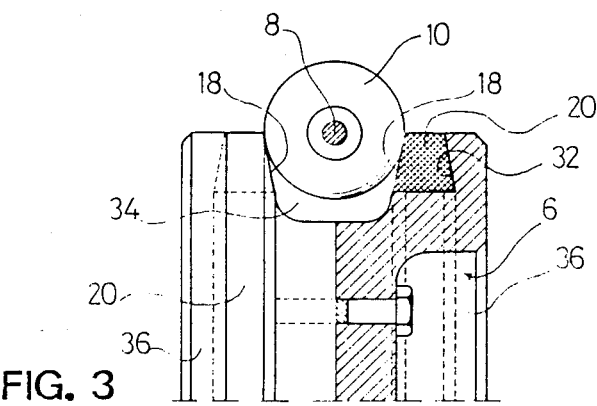

In the following the invention is explained in more detail with reference to the drawing, in which:

FIG. 1 is a top view of a driving station of a conveyor according to the invention, FIG. 2 is a side view thereof, and FIG. 3 is a partial, sectional view illustrating the driving engagement between the conveyor wire and the driving wheel.

The driving station shown comprises a housing 2 with an exterior gear motor generally designated by the reference numeral 4 for a driving wheel generally designated by the reference numeral 6, which engages and drives a conveyor wire or chain 8 provided with a series of conveyor or scraper discs 10. The wire or chain 8 is endless and extends through a conveyor pipe system having an upstream end 12 connected to an outlet opening from a housing portion 14, which receives from above the material to be conveyed in the system, whereby the wire or chain 8, 10 and scrapper discs 10 will in well known manner serve to convey the material out through the pipe system or circuit, where several outlet openings are provided bottomwise in the pipe wall. To the left in FIGS. 1 and 2 is shown the downstream or return end, of the conveyor pipe, which is arranged tangentially to the lower portion of the driving wheel 6.

The wire or chain 8, and scrapper discs 10 pass about the driving wheel 6 and then about a slightly inclined diverter wheel 22 reversing the direction of the wire or chain 8 so as to deliver the wire or chain 8 to the upstream pipe end 12 along the bottom of the housing portion 14.

The slightly inclined diverter wheel 22 additionally serves as a wire stretcher, with the diverter wheel 22 being mounted spring biased on a stretcher block, which is adjustable along guides 24 by means of an external handle 26. A control system, which shall not be further described comprises a detector 30 for the passage of a circular row of marks 28 on the diverter wheel 22, whereby the speed of the diverter wheel wheel 22 is readable.

As shown in FIG. 1 the driving wheel 6 has a peripheral recess 34 which is slightly deeper than the innermost half of the conveyor discs 10, while the outermost wall portions of the recess 34 are slightly inwardly conical and are spaced apart slightly less than the diameter of the conveyor discs 10. The driving wheel 6 or at least the side walls of the recess 34 consist of a material suitable for frictional engagement with the discs 10.

This design of the driving wheel 6 is shown more clearly in FIG. 3, in which, by way of example, the recess wall portions 18 are constituted by the sides of opposed V-belt members 20 rigidly mounted in annular recesses 32 in the driving wheel 6, with the driving wheel 6 being made of two similar halves 36 which are bolted together.

It will be appreciated that by the driving engagement shown in FIG. 3, the conveyor discs 10 will be safely frictionally engaged at opposite edge areas only slightly inside the diameter of the discs. This shows the advantage that the conveyor discs 10 will not get jammed, i.e. they will readily leave the driving wheel 6 at the run off area. Furthermore the pull in the wire 8 will be transferred through the conveyor discs 10 in a balanced manner through the opposite halves of the discs, whereby the pull will be straight, without any tilting tendency of the conveyor discs 10.

It will be understood that the wire 8 is kept reasonably tight about the driving wheel 6, and that to this end it is of course not required that a wire stretcher arrangement is located within the driving station itself.

The diverter wheel 22 and other diverter wheels in the system may be designed principally in the same manner as the driving wheel 6.

It should furthermore be mentioned that the driving wheel 6 may be constituted by two shell-like wheel parts being interconnected by means of transverse distance members and bolts so as to form an open wheel structure which would be self-cleaning.

We claim:

1. A scraper conveyor comprising a conveyor chain or wire, a plurality of transverse scraper members connected to said wire or chain, a stationary conveyor channel means or tube means for at least partially defining a closed path along which said conveyor chain or wire travels, said closed path extending from a material inlet station and passing through at least one receiver station in which material conveyed by the conveyor is dispensable through outlet openings provided in said stationary conveyor channel means or tube means, a driving wheel means for driving the conveyor chain or wire, said driving wheel means being adapted to frictionally engage at least a portion of said transverse scraper members and including a circumferentially substantially smooth wheel having a solid body construction and a profiled outer surface which conditions a frictional engagement between radially narrow frictional portions of the wheel and peripheral wheel engaging portions of outer edges of the respective scraper members, said profiled outer surface of said driving wheel means including an outer recess means disposed along a periphery thereof for receiving approximately one-half of the respective transverse scraper members and a pair of annular recess means disposed in opposed inner wall portions of said outer recess means for respectively rigidly receiving opposed V-belt members defining said radially narrow frictional portions of the wheel, and wherein means are provided for tightening a movable element of the conveyor about the driving wheel means sufficiently to ensure a firm frictional engagement between the conveyor and the driving wheel means.

2. A conveyor according to claim 1, wherein the radially narrow frictional portions frictionally engage the respective scraper members adjacent substantially diametrically opposite etched portions thereof.

3. A conveyor according to claim 2, wherein the scraper members include a plurality of scraper discs.

* * * * *